(12) United States Patent
Osada et al.

(10) Patent No.: US 8,313,827 B2
(45) Date of Patent: Nov. 20, 2012

(54) LAMINATED FILM AND MOLDING AND REFLECTOR

(75) Inventors: Syunichi Osada, Otsu (JP); Wataru Gouda, Otsu (JP)

(73) Assignee: Toray Industries, Inc., Tokyo (JP)

( * ) Notice: Subject to any disclaimer, the term of this patent is extended or adjusted under 35 U.S.C. 154(b) by 149 days.

(21) Appl. No.: 12/865,277

(22) PCT Filed: Jan. 22, 2009

(86) PCT No.: PCT/JP2009/050917
§ 371 (c)(1),
(2), (4) Date: Jul. 29, 2010

(87) PCT Pub. No.: WO2009/096298
PCT Pub. Date: Aug. 6, 2009

(65) Prior Publication Data
US 2010/0330350 A1 Dec. 30, 2010

(30) Foreign Application Priority Data
Feb. 1, 2008 (JP) ................................. 2008-022457

(51) Int. Cl.
*B32B 7/02* (2006.01)
(52) U.S. Cl. ........................................ 428/213; 428/220
(58) Field of Classification Search .................... 428/213
See application file for complete search history.

(56) References Cited

U.S. PATENT DOCUMENTS

| | | | |
|---|---|---|---|
| 5,122,905 A | 6/1992 | Wheatley et al. | |
| 5,122,906 A | 6/1992 | Wheatley et al. | |
| 5,126,880 A * | 6/1992 | Wheatley et al. | 359/587 |
| 2007/0128419 A1* | 6/2007 | Osada et al. | 428/216 |
| 2009/0223704 A1 | 9/2009 | Osada et al. | |

FOREIGN PATENT DOCUMENTS

| | | |
|---|---|---|
| JP | 3-41401 | 2/1991 |
| JP | 03-041401 A | 2/1991 |
| JP | 4-295804 | 10/1992 |
| JP | 04-295804 A | 10/1992 |
| JP | 2004-160851 A | 6/2004 |
| JP | 2005-313586 A | 11/2005 |
| JP | 2007-176154 A | 7/2007 |
| JP | 2007-271896 A | 10/2007 |
| WO | WO 2005/037544 A1 | 4/2005 |
| WO | WO 2007/020861 A1 | 2/2007 |

OTHER PUBLICATIONS

International Search Report dated May 19, 2009, application No. PCT/JP2009/050917.

* cited by examiner

*Primary Examiner* — David Sample
*Assistant Examiner* — Tahseen N Khan
(74) *Attorney, Agent, or Firm* — RatnerPrestia

(57) ABSTRACT

A laminated film with 200 or more laminated layers which include at least layers comprising a resin A and layers comprising a resin B where, taking the layers comprising the resin A having a layer thickness from 10 nm to 1000 nm as a layer group L, the layer group L has layers La, Lb and Lc and, in the direction from one surface to the other, these are arranged in the order of the layer La, the layer Lb, and the layer Lc, the thicknesses of the layers La and Lc are the same and at least 30 layers, each layer comprising the resin A, are included between the layer La and the layer Lc, and the thickness of the layer La is at least 1.4-fold or more and 0.7-hold or less the thickness of the layer Lb.

10 Claims, 8 Drawing Sheets

A.

2μm

B.

An enlarged picture of part
(☐ part) of the figure A

LAMINATED FILM AND MOLDING AND REFLECTOR

CROSS REFERENCE TO RELATED APPLICATIONS

This application is a U.S. National Phase Application of PCT International Application No. PCT/JP2009/050917, filed Jan. 22, 2009, which claims priority to Japanese Patent Application No. 2008-022457, filed Feb. 1, 2008, the contents of these applications being incorporated by reference herein in their entirety.

FIELD OF THE INVENTION

The present invention relates to a laminated film in which layers comprising at least two kinds of resins are laminated, and a molding or a reflector made of the laminated film.

BACKGROUND OF THE INVENTION

In products (parts) such as various household electrical appliances and construction members including decoration parts related to automobiles, various decorations such as a wood tone, a cloth tone and a metal tone have been used in order to enhance design property, but recently, a metal tone appearance of high luminance has been demanded.

As a procedure of imparting a metal tone to various molded parts, the most generally used procedure is coating. While coating can impart various designs or functions to products, organic solvents or the like are used frequently, and it greatly influences on the environment. In addition, recycling cannot be easily performed in some cases by the influence of a coating film, and the presence of a coating step is regarded as a problem under a current rise in an environmental problem.

As another procedure of imparting a metal tone, there are plating and deposition. Also in the case of plating and deposition, there is a problem of difficulty in recycling due to a metal layer, but particularly in the case of plating, since the influence on the environment due to a heavy metal is great, a substitute for the heavy metal has been strongly demanded. Further, in the case of plating and deposition, since electromagnetic shielding property is generated due to the metal layer, when used as a material for decorating automobiles and cellular phones, radio disturbance is generated in some cases, which has been becoming a problem.

As a material having a metal-like luster without using a metal, conventionally, there has been an example (see, for example, Patent Literatures 1 to 2) of using a film which selectively reflects the light of a particular wavelength, by alternately laminating resin layers having different refraction indices into a multilayer. However, in these techniques, since a difference in refraction indices of resins used is too great, affinity between the resin layers is insufficient, and there is a defect of generating inter-layer peeling, and therefore it is actually difficult to use the material in molding decoration. In addition, there is also a problem that, when a film having a low reflection ratio such as a half-mirror is produced, coloring is generated.

In response to these problems, there is a film of a metal luster tone without coloring, which is realized by adequately adjusting a difference in refraction indices of resins used to suppress inter-layer peeling and, at the same time, forming an especial layer structure (see Patent Literature 3). In this case, when a film having a low reflection ratio such as a half-mirror is produced, there is a problem that the film is slightly easily colored, and an interference pattern is easily seen. In addition, since the distribution in a layer thickness is greatly different between a front side and a back side, there is a problem that, when the film is prepared into a molding, warping or the like is generated due to a difference in thermal shrinkage/thermal expansion property between the front side and the back side.

In addition, there is a problem that, when a multilayer laminated film such as one in Patent Literatures 1 to 3 is insert-molded, a defective molding phenomenon called washout (hereinafter, referred to as WashOut in some cases) occurs. WashOut is a phenomenon in which a film or ink around a gate portion is melted and flown. Particularly, in the case of a multilayer laminated film, there is a problem that, even when the film is not melted, bending deformation in a portion of a layer shifts an interference reflection wavelength, and particular discoloration is generated, which becomes a defect.

[Patent Literature 1] JP-A-Hei03-41401
[Patent Literature 2] JP-A-Hei04-295804
[Patent Literature 3] WO 2007/20861 Pamphlet

SUMMARY OF THE INVENTION

In view of the problems of the prior art, the present invention provides a film which, while having a natural metal tone or half-mirror tone, has no coloring or inter-layer peeling and with which no interference pattern is seen. The present invention also provides moldings and reflectors which have excellent recycling properties and impose a low environmental burden, which do not obstruct electromagnetic waves and with which there is no warping, WashOut or the like.

The laminated film in one embodiment of the present invention is a laminated film with 200 or more laminated layers which include at least layers comprising a resin A and layers comprising a layers B where, taking the layers comprising the resin A having a layer thickness from 10 nm to 1000 nm as a layer group L, the layer group L has layers La, Lb and Lc and, in the direction from one surface to the other, these are arranged in the order of the layer La, the layer Lb, and the layer Lc, the thicknesses of the layers La and Lc are the same and at least 30 layers, each layer comprising the resin A, are included between the layer La and the layer Lc, and the thickness of the layer La is at least 1.4-fold or more and 0.7-fold or less the thickness of the layer Lb.

The laminated film in embodiments of the present invention, while having a natural metal tone or half-mirror tone, has no coloring or inter-layer peeling, and no interference pattern is seen therewith.

In addition, moldings and reflectors comprising the laminated film in embodiments of the present invention are excellent in recycling properties, do not shield electromagnetic waves, and have no warping or WashOut.

Figure 1:
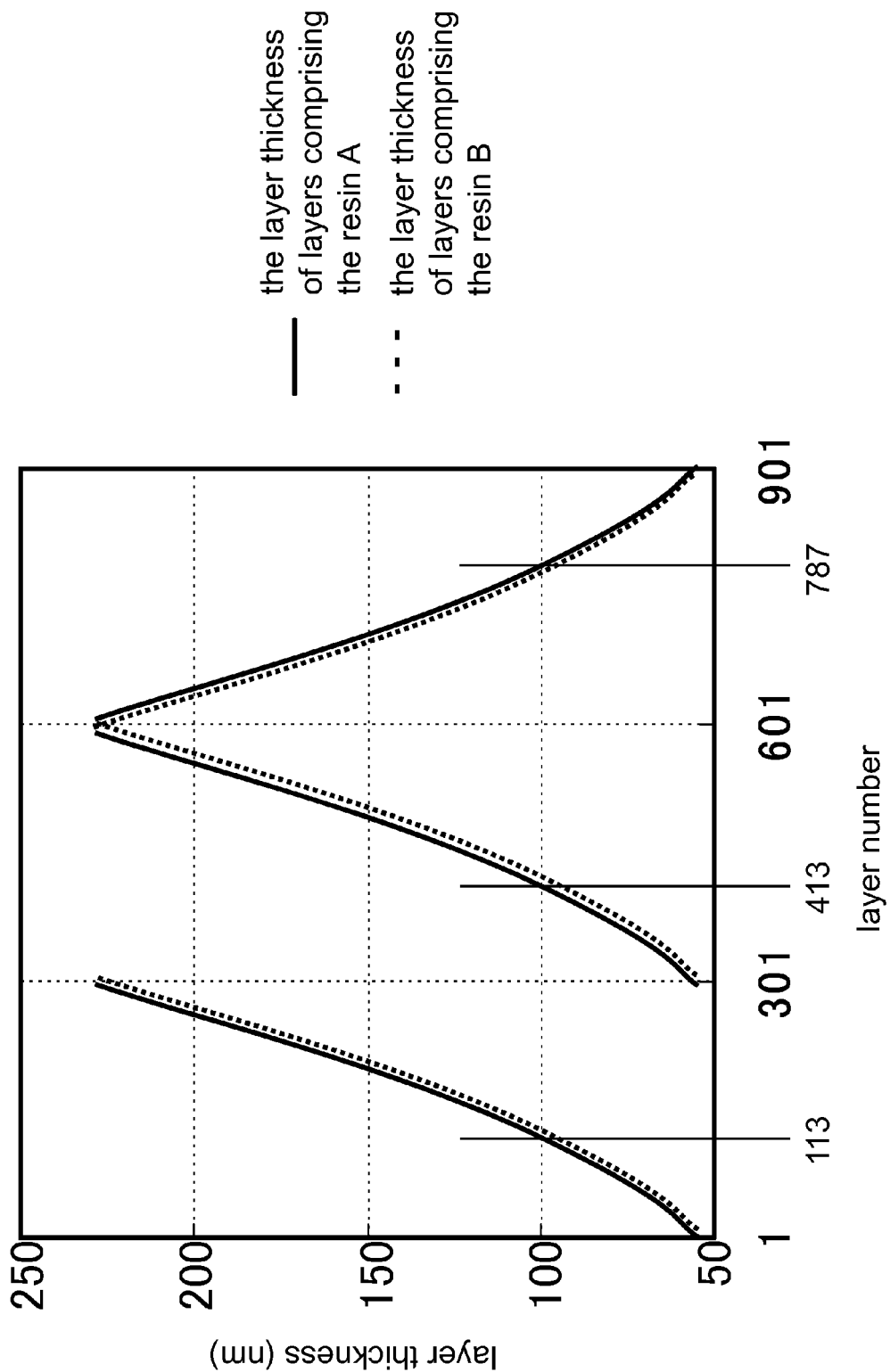
FIG. 1 Designed layer thicknesses of Examples 1 to 3
FIG. 2 Designed layer thicknesses of Examples 4 to 5
FIG. 3 Designed layer thickness of Example 6
FIG. 4 Designed layer thickness of Example 7
FIG. 5 Designed layer thickness of Example 8
FIG. 6 Designed layer thickness of Comparative Example 1
FIG. 7 Designed layer thickness of Comparative Example 2
FIG. 8 One example of bending deformation of layer The laminated film in one embodiment of the present invention is a laminated film with 200 or more laminated films which include at least layers comprising a resin A and layers comprising a resin B where, taking the layers comprising the resin A having a layer thickness from 10 nm to 1000 nm as a layer group L, the layer group L has layers La, Lb and Lc and, in the direction from one surface to the other, these are arranged in the order of the layer La, the layer Lb, and the layer Lc, the thicknesses of the layers La and Lc are the same and at least 30 layers, each layer comprising the resin A, are included between the layer La and the layer Lc, and the thickness of the layer La needs to be at least 1.4-fold or more and 0.7-fold or less the thickness of the layer Lb. Such a film, while having a natural metal tone or half-mirror tone, has no coloring or inter-layer peeling, and no interference pattern is seen therewith.

In addition, since the laminated film in one embodiment of the present invention is composed of a polymer, the film becomes a metal tone film with which electromagnetic waves are transmitted. Herein, the electromagnetic waves refer to portions of an infrared-ray and those having a frequency of 3 Hz to 3 THz.

The resin A or the resin B in embodiments of the present invention may be either of a thermoplastic resin or thermosetting resin. Alternatively, the resin A or the resin B may be a homo resin, a copolymer resin or a blend of two or more kinds. More preferably, the resin is a thermoplastic resin due to good moldability. Also, various additives such as antioxidants, electrostatic agents, crystal nucleating agents, inorganic particles, organic particles, viscosity decreasing agents, thermal stabilizers, lubricants, infrared absorbing agents, ultraviolet absorbing agents, and doping agents for adjusting a refraction index may be added to each resin.

Examples of the thermoplastic resin include polyolefin resins such as polyethylene, polypropylene, polystyrene and polymethylpentene, alicyclic polyolefin resins, polyamide resins such as nylon 6 and nylon 66, aramid resins, polyester resins such as polyethylene terephthalate, polybutylene terephthalate, polypropylene terephthalate, polybutyl succinate and polyethylene-2,6-naphthalate, polycarbonate resins, polyarylate resins, polyacetal resins, polyphenylene sulfide resins, fluorine resins such as a tetrafluoro ethylene resin, a trifluoro ethylene resin, a chlorotrifluoro ethylene resin, a tetrafluoro ethylene-hexafluoro propylene copolymer and a vinylidene fluoride resin, acrylic resins, methacrylic resins, polyacetal resins, polyglycolic acid resins and polylactic acid resins. Among them, particularly, a polyester is more preferable from the viewpoint of strength, heat resistance and transparency.

The polyester mentioned in embodiments of the present invention refers to a homopolyester or a copolymer polyester which is a polycondensate of a dicarboxylic acid component backbone and a diol component backbone. Herein, typical examples of the homopolyester include polyethylene terephthalate, polypropylene terephthalate, polybutylene terephthalate, polyethylene-2,6-naphthalate, poly-1,4-cyclohexanedimethylene terephthalate and polyethylene diphenylate. Particularly, since polyethylene terephthalate is of a low cost, it can be used for various applications and it is preferable.

The copolymer polyester in embodiments of the present invention is defined as a polylcondensate composed of at least three components selected from the following components having a dicarboxylic acid backbone and components having a diol backbone. Examples of the components having a dicarboxylic acid backbone include terephthalic acid, isophthalic acid, phthalic acid, 1,4-naphthalenedicarboxylic acid, 1,5-naphthalenedicarboxylic acid, 2,6-naphthalenedicarboxylic acid, 4,4'-diphenyldicarboxylic acid, 4,4'-diphenylsulfonedicarboxylic acid, adipic acid, sebacic acid, dimer acid, and cyclohexanedicarboxylic acid and ester derivatives thereof.

Examples of the components having a glycol backbone include ethylene glycol, 1,2-propanediol, 1,3-butanediol, 1,4-butanediol, 1,5-pentanediol, diethylene glycol, polyalkylene glycol, 2,2-bis(4'-β-hydroxyethoxyphenyl) propane, isosorbate, 1,4-cyclohexanedimethanol and spiroglycol.

In one aspect of the present invention, an in-plane average refraction index of the layer comprising the resin A is relatively higher or lower than an in-plane average refraction index of the layer comprising the resin B. In addition, it is preferable that a difference between the in-plane average refraction index of the A layer and the in-plane average refraction index of the B layer is 0.03 or more. The difference is more preferably 0.05 or more, further preferably 0.1 or more and 0.15 or less. When the difference is less than 0.03, a sufficient reflection ratio is not obtained and it is not preferable. In addition, when a difference between the in-plane average refraction index of the A layer and a refraction index in the thickness direction is 0.03 or more, and a difference in the in-plane average refraction index of the B layer and a refraction index in the thickness direction is 0.03 or less, since a reduction in a reflection ratio of a reflection peak does not occur even when an incident angle becomes greater and it is more preferable.

As a preferable combination of the resin A and the resin B in one aspect of the present invention, it is primarily preferable that an absolute value in a difference between SP values of the resin A and the resin B is 1.0 or less. When the absolute value of the difference in the SP value is 1.0 or less, inter-layer peeling is difficult to occur. More preferably, the film has a layer comprising the resin A, and a layer comprising the resin B including the same fundamental backbone as that of the resin A. Herein, the fundamental backbone is a repetition unit constituting a resin and, for example, in the case where one of the resins is polyethylene terephathalate, ethylene terephathalate is a fundamental backbone. In addition, as another example, when one of the resins is polyethylene, ethylene is a fundamental backbone. When the resin A and the resin B are resins having the same fundamental backbone, peeling between layers is more difficult to occur. The SP value mentioned in the present invention is obtained by using a calculation method of Small. The calculation method of Small is detailed in "Polymer Data Handbook-Basic Edition-" (published by Baifukan CO., LTD., 1986).

As a preferable combination of the resin A and the resin B, it is preferable that a difference in a glass transition temperature between the resin A and the resin B is 20° C. or less. When the difference in a glass transition temperature is more than 20° C., the thickness uniformity upon forming a laminated film becomes worse, and a metal luster appearance becomes worse. In addition, upon molding the laminated film, a problem such as occurrence of overstretching easily occurs.

In the laminated film in an embodiment of the present invention, it is preferable that the resin A includes polyethylene terephthalate or polyethylene naphthalate, and the resin B is a polyester comprising spiroglycol. The polyester comprising spiroglycol refers to a copolyester obtained by copolymerizing spiroglycol, or a homopolyester, or a polyester obtained by blending them. The polyester comprising spiroglycol is preferable since it is overstretched with difficulty at molding, and inter-layer peeling occurs with difficulty due to a small difference in a glass transition temperature between the polyester and polyethylene terephthalate or polyethylene naphthalate. More preferably, the resin A includes polyethylene terephthalate or polyethylene naphthalate, and the resin B is a polyester comprising spiroglycol and cyclehexanedicarboxylic acid. When the resin B is a polyester comprising spiroglycol and cyclohexanedicarboxylic acid, since a difference in an in-plane refraction index between the polyester and polyethylene terephthalate or polyethylene naphthalate becomes great, a high reflection ratio is easily obtained. In addition, since a difference in a glass transition temperature between the polyester and polyethylene terephthalate or polyethylene naphthalate is small, and adhering property is excellent, overstretching occurs with difficulty at molding, and inter-layer peeling occurs with difficulty.

In the laminated film in an embodiment of the present invention, it is preferable that the resin A includes polyethylene terephthalate or polyethylene naphthalate, and the resin B is a polyester comprising cyclohexanedimethanol. The polyester comprising cyclohexanedimethanol refers to a copolyester obtained by copolymerizing cyclohexanedimethanol, or a homopolyester, or a polyester obtained by blending them. The polyester comprising cyclohexanedimethanol is preferable since it is overstretched with difficulty at molding, and inter-layer peeling occurs with difficulty due to a small difference in a glass transition temperature between the polyester and polyethylene terephthalate or polyethylene naphthalate. More preferably, the resin B is an ethylene terephthalate polycondensate having a copolymerization amount of cyclohexanedimethanol of 15 mol % or more and 60 mol % or less. This makes it possible to make the change in optical properties, particularly, due to heating or with time small and to make the inter-layer peeling difficult to occur, while possessing high reflection performance. The ethylene terephthalate polylcondensate having a copolylmerization amount of cyclohexanedimethanol of 15 mol % or more and 60 mol % or less adheres to polyethylene terephthalate very strongly. In addition, since the cyclohexanedimethanol group has a cis body or a trans body as a geometrical isomer, and has a chair-type or a boat-type as a conformational isomer, when costretched with polyethylene terephthalate, the resin is orientation-crystallized with difficulty, a reflection ratio is high, the change in optical properties due to thermal history is more small, and breaking at film forming occurs with difficulty.

The laminated film in an embodiment of the present invention needs to be a laminated film with 200 or more laminated layers which include at least layers comprising the resin A and layers comprising the resin B. Herein, the number of laminated layers is more preferably 400 or more, further preferably 700 or more. When the number of layers is greater, a reflection ratio is high, and it becomes easy to widen a reflection band.

In addition, in an embodiment of the present invention, it is preferable that the film includes a structure in which a layer comprising the resin A and a layer comprising resin the B are alternately laminated. That is, it is preferable that the film has a portion having a structure in which a layer comprising the resin A and a layer comprising the resin B are alternately laminated in the thickness direction.

In an embodiment of the present invention, the film needs to have a layer group L comprising the resin A having a layer thickness of 10 nm or more and 1000 nm or less. That is, the layer group L is layers comprising the resin A having thicknesses of all layers contained in the laminated film of 10 nm or more and 1000 nm or less. It is preferable that the number of the layers contained in the layer group L is 90 or more. The number is more preferably 190 or more, further preferably 340 or more. It is not necessary that the layers contained in the layer group L are necessarily continuously adjacent, and a layer having a layer thickness of less than 10 nm, or a layer comprising the resin A having a layer thickness of more than 1000 nm may intervene.

One example satisfying a layer constitution of the laminated film of the present invention is exemplified in FIG. 1. FIG. 1 plots the layer thickness of layers comprising the resin A of a film in which a layer comprising the resin A and a layer comprising the resin B are alternately laminated, corresponding to each layer order (hereinafter, referred to as layer number). Therefore, in the figure, plots appear line-like at first sight, the layer thickness corresponds to only a layer number which is an integer, and a layer of a layer number of an odd is a layer comprising the resin A, and a layer of a layer number of an even is a layer comprising the resin B. This point is also the same as in FIG. 2 to FIG. 8. On the other hand, one example satisfying a layer constitution of the prior art (Patent Literature 3) is exemplified in FIG. 6 similarly. As is seen from FIG. 1, when the layer constitution of the present invention is satisfied, since distribution of the layer thickness of a film cross section can be symmetric or approximately symmetric between a front side and a back side, a difference in physical properties between the front side and the back side can be suppressed, and curling which occurs at heating can be also suppressed. Further, in order to render the film a metal tone or a half-mirror tone, as shown in the figure, the film needs to have a structure in which the layer thickness is gradually changed, however, in the case of the layer constitution which can be approximated by a monotonous increasing curve or a monotonous decreasing curve as shown in FIG. 6, particularly, when the film is rendered a half-mirror tone or the like, since lamination deterioration in a small portion leads to a reduction in a reflection ratio of light having a specific wavelength, coloring easily occurs. On the other hand, in the case where the film includes the layer constitution in which the layer thickness is increased from one surface to the opposite surface and, thereafter, is decreased as shown in FIG. 1, even when lamination deterioration occurs in a small portion, and a value is departed from a designed value, since the same degree of the layer thickness is present at other site, it is possible to compensate for the layer thickness distribution as a whole, a reduction in a reflection ratio of light having a specific wavelength is small and coloring becomes difficult to occur.

In addition, bending deformation occurs, in some cases, in a layer in the interior of a film near a resin by heat and a shearing stress due to the resin supplied from an injection molding machine at insert molding. In the case of the layer constitution shown in FIG. 6, when bending deformation of a layer occurs, since there is no compensating layer thickness, coloring occurs, which becomes molding deterioration called WashOut. On the other hand, in the case of the layer constitution shown in FIG. 1, even when bending deformation occurs in a layer in the interior of the film near the resin, since bending deformation occurs with difficulty in a layer in the interior of a film on the opposite side, this can compensate for the layer thickness, and it is possible to make discoloration unremarkable.

Figure 3:
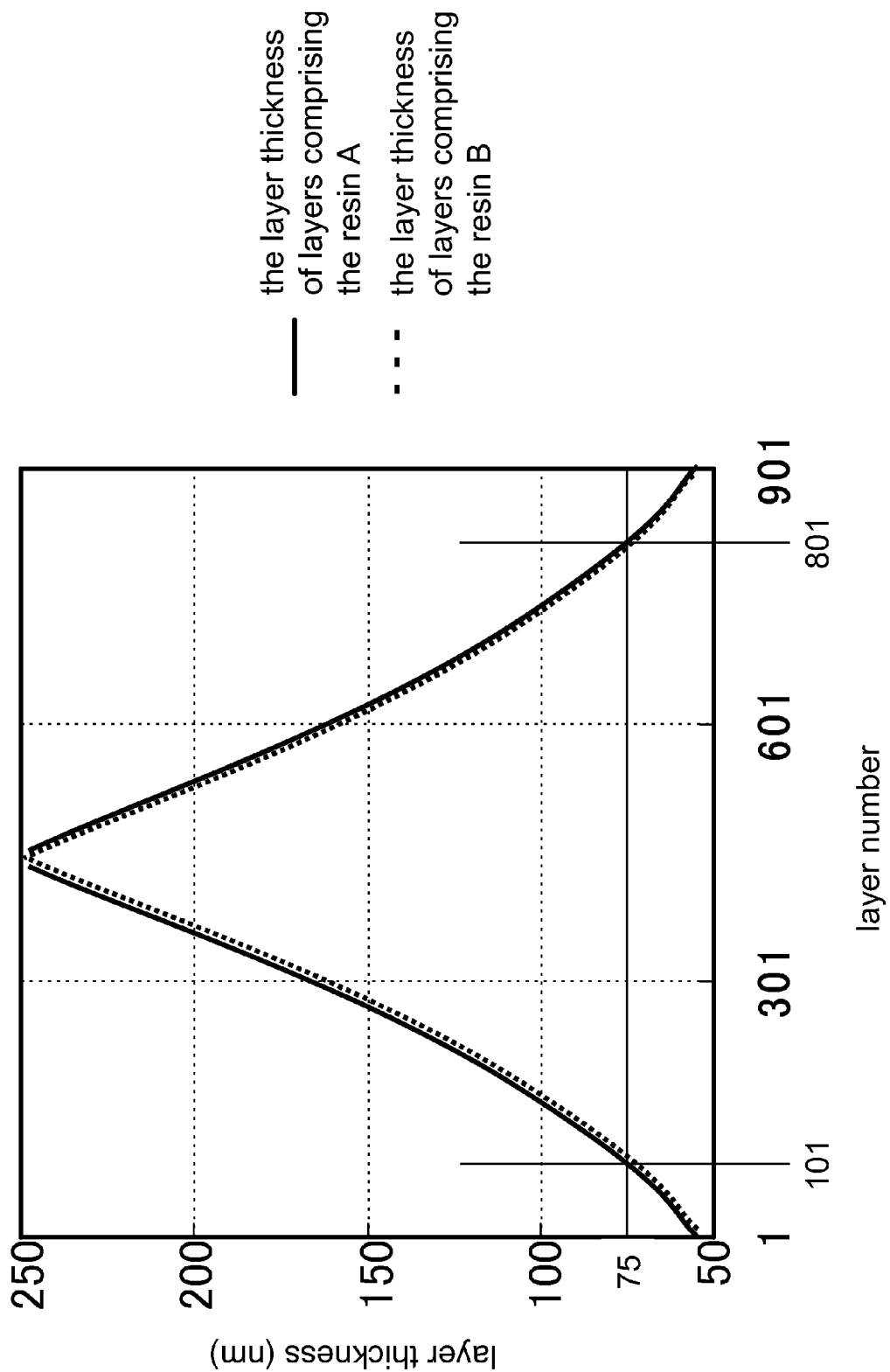

In addition, this layer group L has a layer La, a layer Lb, and a layer Lc, layers are arranged in the order of the layer La, the layer Lb, and the layer Lc from one surface to the other surface, the thickness of the layer La and the thickness of the layer Lc are equal, and at least 30 layers, each layer comprising the resin A, are included between the layer La and the layer Lc, and the thickness of the layer La needs to be 1.4-fold or more and 0.7-fold or less the thickness of the layer Lb. Herein, the matter that the thickness of the layer La and the thickness of the Lc are equal refers to the fact that the thickness of the layer Lc is 0.95-fold or more and 1.05-fold or less relative to the thickness of the layer La. Herein, with reference to FIG. 3 as an example, the layer La, the layer Lb, and the layer Lc will be specifically described. FIG. 3 is one example of a constitution of the layer thickness of a preferable aspect of the present application. The layers comprising the resin A in FIG. 3 can be regarded as the layer group L and, if a layer number 101 and a layer number 801 having a layer thickness of 75 nm are set to a layer La and a layer Lc, respectively, a layer Lb is any one of layer number 103 to a layer number 799, and becomes a layer comprising the resin A having a layer thickness of 105 nm or more (105 nm/75 nm=1.4). Then, the description will be carried out with reference to FIG. 1 as an example. FIG. 1 is also one example of a constitution of the layer thickness of a preferable aspect of the present application. The layers comprising the resin A in FIG. 1 can be regarded as the layer group L and, if a layer number 113 and a layer number 787 having a layer thickness of 100 nm are set to a layer La and a layer Lc, respectively, a layer Lb is any one of a layer number 115 to a layer number 785, and becomes a layer comprising the resin A having a layer thickness of 140 nm or more (140 nm/100 nm=1.4) or a layer comprising the resin A having the layer thickness of 70 nm or less (70 nm/100 mm=0.7).

It is preferable that at least 60 layers, each layer comprising the resin A, are included between the layer La and the layer Lc. More preferable is 90 or more layers. When the layer number is less than 30 layers, a reflection ratio becomes too low. The upper limit thereof is not particularly limited, but when the layer number is 1000 layers or more, the film thickness becomes too great in some cases. It is further preferable that at least 50 layers, each layer comprising the resin A, are included between the layer La and the layer Lb, and between the layer Lb and the layer Lc. In such a case, coloring is small, and interference variation becomes difficult to be seen.

It is preferable that the thickness of the layer La is 1.8-fold or more or 0.55-fold or less the thickness of the layer Lb. Further preferably, the thickness of the layer La is 2.5-fold or more or 0.4-fold or less the thickness of the layer Lb. When a film has such a layer structure, since a deviation from an optical designed value of the layer thickness can be compensated in the layer group L, coloring or the like becomes difficult to occur. Since the state of variation of the layer thickness is randomized, a reflection band becomes ripple with difficulty, and an interference pattern becomes difficult to be seen.

In the laminated film in an embodiment of the present invention, it is preferable that the layer group L has a layer La, a layer Lb, a layer Lc, and a layer Ld, in the direction from one surface to the other, these layers are arranged in the order of the layer La, the layer Lb, the layer Lc and the layer Ld, the thickness of the layer Lb and the thickness of the layer Ld are equal, and at least 30 layers, each layer comprising the resin A, are included between the layer Lb and the layer Ld. In the case of such a layer constitution, coloring becomes further difficult to occur and, at the same time, interference variation becomes difficult to be seen. Herein, the matter that the thickness of the layer Lb and the thickness of the layer Ld are equal refers to the fact that the thickness of the layer Ld is 0.95-fold or more and 1.05 fold or less relative to the thickness of the layer Lb.

Herein, with reference to FIG. 1 as an example, the layer La, the layer Lb, the layer Lc and the layer Ld will be described. The layers comprising the resin A in FIG. 1 can be regarded as the layer group L and, if a layer number 113 and a layer number 413 having a layer thickness of 100 nm are set to a layer La and a layer Lc, respectively, a layer Lb is any one of a layer number 115 to a layer number 411, and becomes a layer comprising the resin A having a layer thickness of 140 nm or more (140 nm/100 nm=1.4) or a layer comprising the resin A having a layer thickness of 70 nm or less (70 nm/100 nm=0.7). The layer Ld is any one of a layer number 415 to a layer number 901, and becomes a layer comprising the resin A having a layer thickness of 140 nm or more (140 nm/100 nm=1.4) or a layer comprising the resin A having a layer thickness of 70 nm or less (70 nm/100 nm=0.7).

It is also preferable that the thickness of a layer comprising the resin A present between the layer La and the layer Lb becomes gradually greater, or becomes gradually smaller from the layer La toward the layer Lb. Herein, in the matter that the thickness of a layer becomes gradually greater or becomes gradually smaller, it is not necessarily required that the layer thickness is increased or decreased in the arrangement order of layers, and it may be enough that the layer thickness is increased or decreased when seen totally. When more strictly defined, layers comprising the resin A included between the layer La and the layer Lb are divided into every 10 layers in the arrangement order of layers, and it may be enough that an average value of layer thickness within the block is increased or decreased in accordance with the arrangement order.

In the laminated film of an embodiment of the present invention, it is preferable that the film has a layer Ma, a layer Mb and a layer Mc comprising the resin B, the layer La and the layer Ma are adjacent to each other, the layer Lb and the layer Mb are adjacent to each other, the layer Lc and the layer Mc are adjacent to each other, the thickness of the layer La is 1.4-fold or more the thickness of the layer Lb and the thickness of the layer Ma is 1.4-fold or more the thickness of the layer Mb, or the thickness of the layer La is 0.7-fold or less the thickness of the layer Lb and the thickness of the layer Ma is 0.7-fold or less the thickness of the layer Mb. In such a case, since reflection efficacy is enhanced, it becomes easy to obtain a film having a high reflection ratio. In addition, more preferably, it is preferable that the ratio of the thicknesses of a layer comprising the resin A and a layer comprising the resin B which are adjacent to each other are approximately constant.

In the laminated film in an embodiment of the present invention, it is preferable that a resin constituting a layer present between the layer La and the layer Lc is the resin A or the resin B. It is preferable that all layers included between a layer closest to one surface and a layer closest to the other surface in the layer group L contains a thermoplastic resin. This is because when two films are bonded to each other with an adhering layer such as a curable resin, a foreign matter becomes a problem, and foaming occurs at molding.

Figure 4:
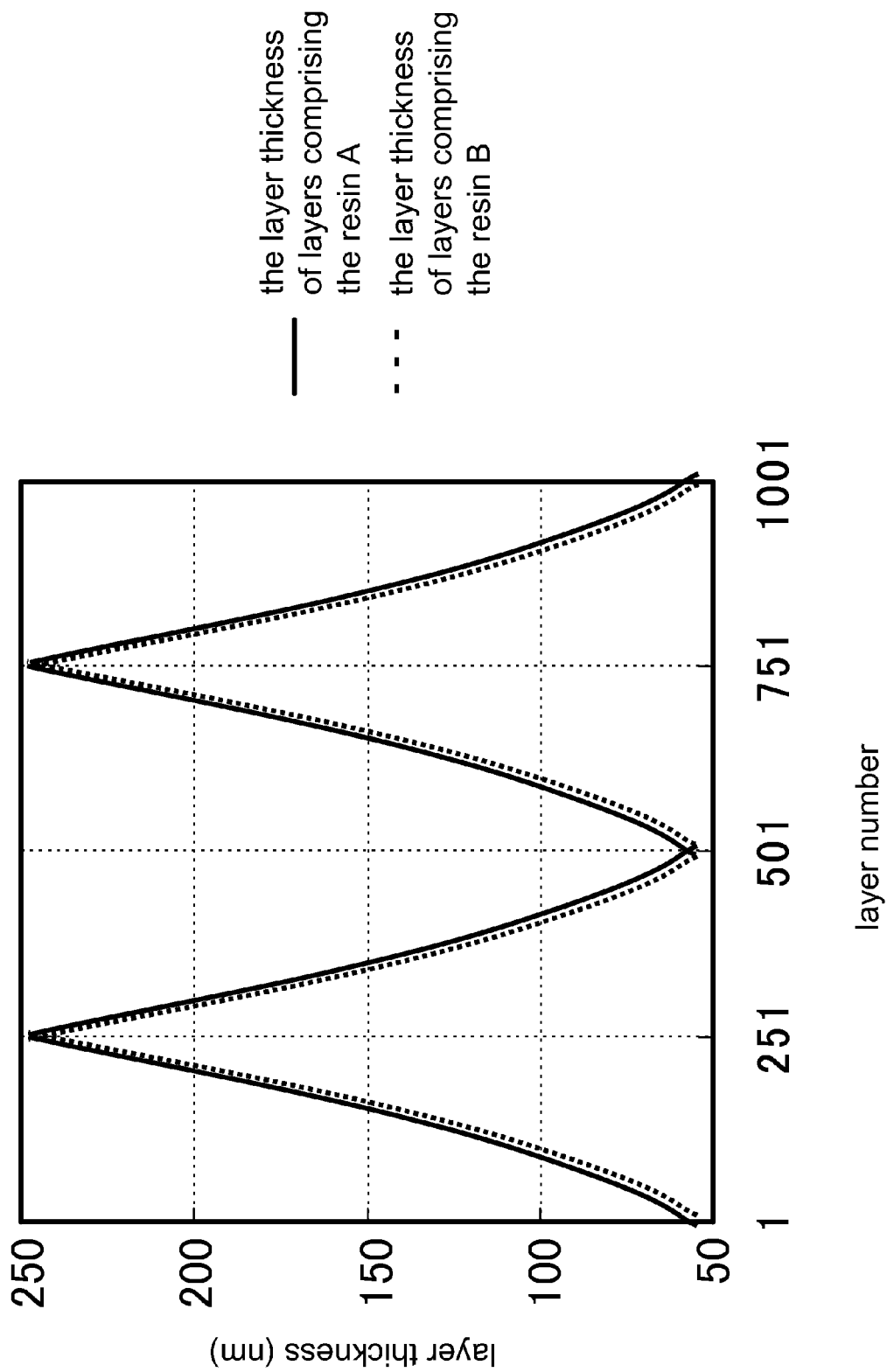
Figure 5:
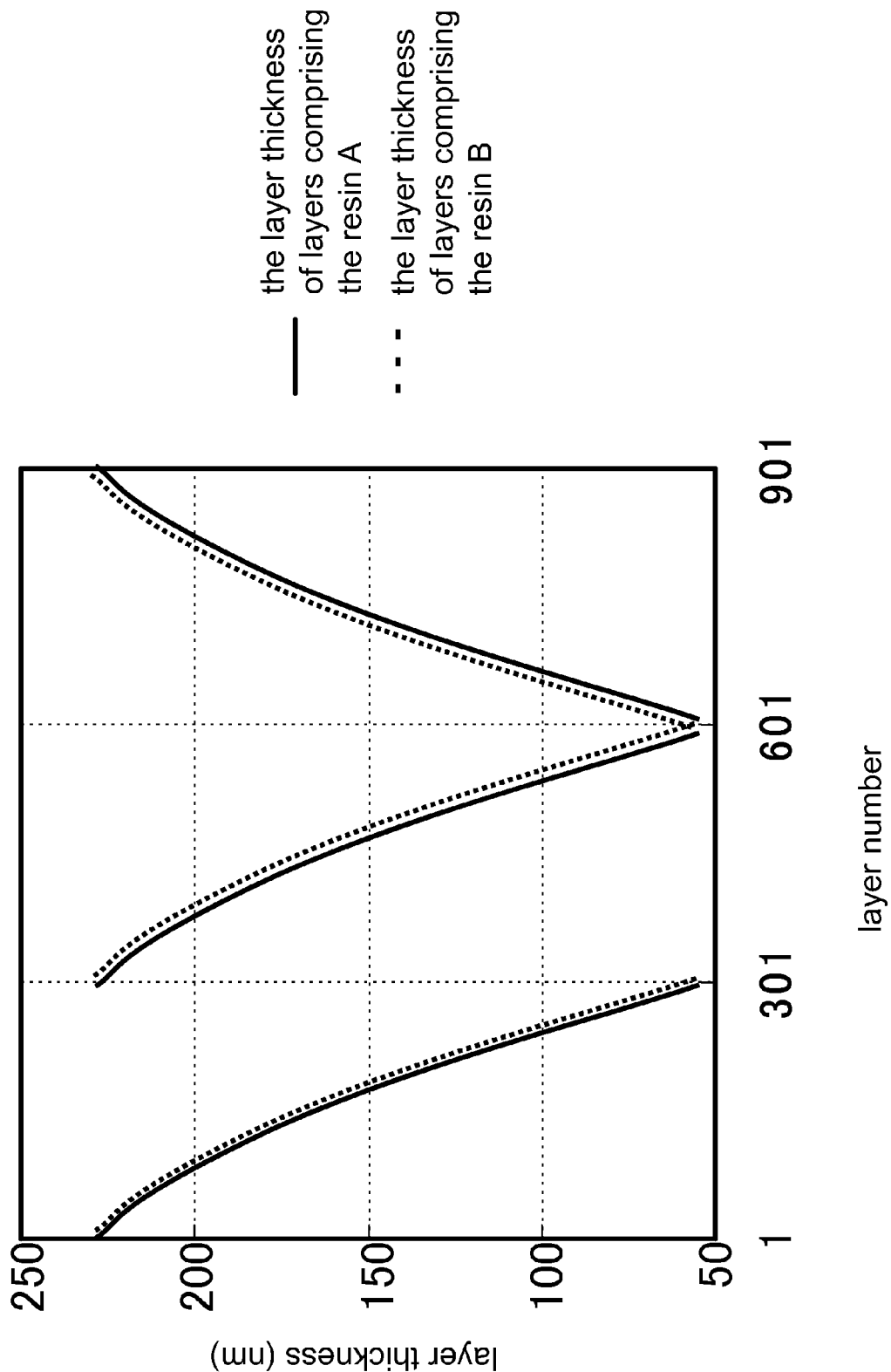
Figure 6:
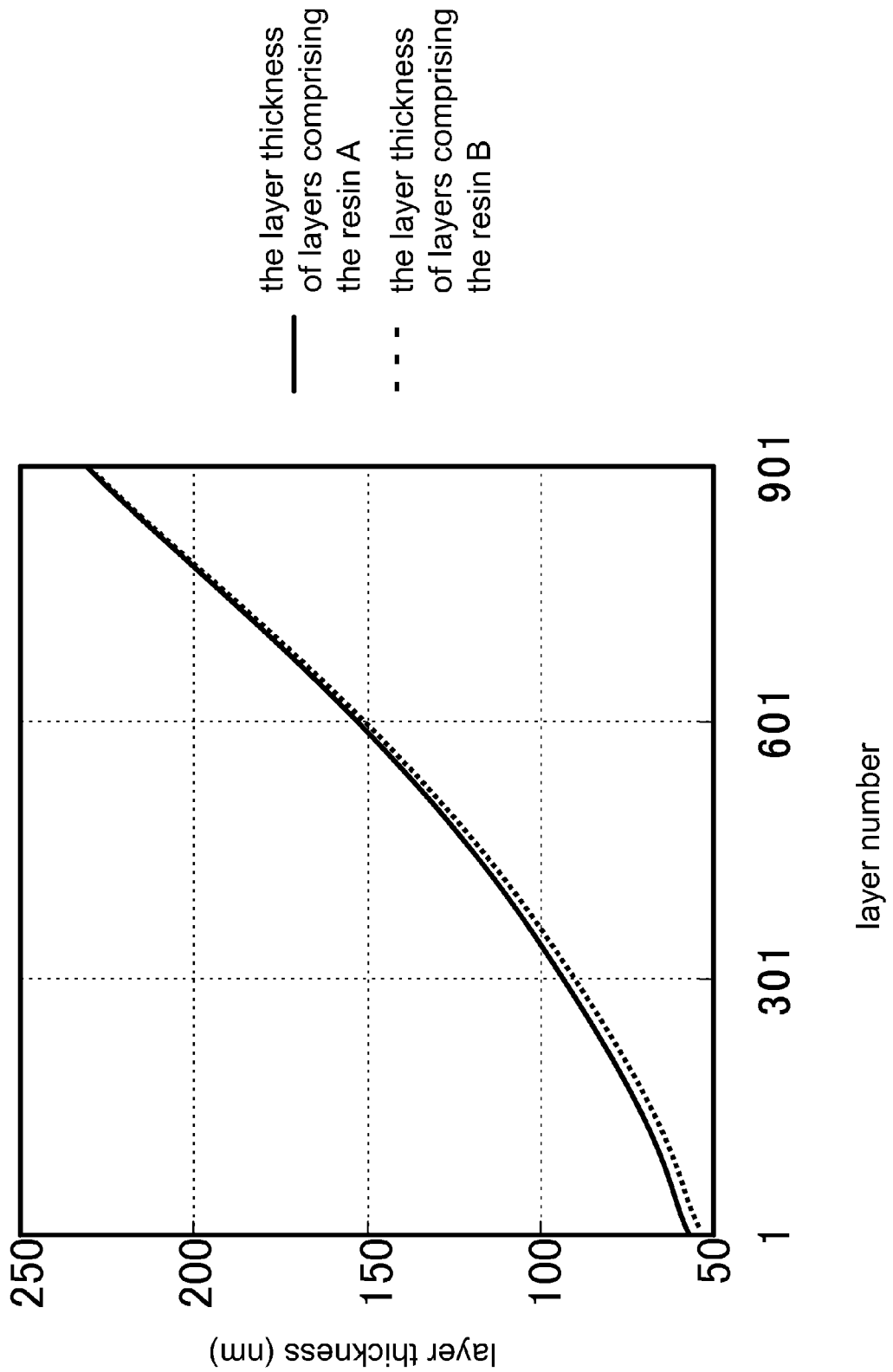

In addition, in one aspect of the present invention, conveniently, a constitution of the layer thickness in FIG. 6 is referred to as a one-step slant structure, a constitution of the layer thickness in FIG. 3 is referred to as a two-step slant structure, constitutions of the layer thickness in FIG. 1 and FIG. 5 are referred to as a three-step slant structure and a constitution of the layer thickness in FIG. 4 is referred to as a four-step slant structure. The one-step slant structure refers to a constitution in which distribution of the layer thickness can be approximated by one monotonous increase curve or monotonous decrease curve. On the other hand, for example, a three-step slant structure refers to a constitution in which distribution of the layer thickness can be approximated by three monotonous increase curves and/or monotonous decrease curves. In one aspect of the present invention, a two or more-step slant structure is preferable, and a three or more-step slant structure is further preferable. When a structure becomes the three or more-step slant structure, an interference pattern becomes hardly seen and, when used as a half-mirror, little coloring is generated even by change in an angle.

It is preferable that an adhering layer having a layer thickness of 3 μm or more comprising a resin other than the resin A or the resin B is not included. When the adhering layer having a layer thickness of 3 μm or more comprising a resin other than the resin A or the resin B is included, a wrinkle is formed or peeling is generated at molding by the influence of the adhering layer. In addition, when two laminated films are bonded to each other by dry lamination coating or the like, since a foreign matter is contaminated into the adhering layer, a problem of reduction in yield as a molding arises. In the laminated film of the present invention, since a peculiar layer constitution can be obtained by co-extrusion technique without using bonding, a wrinkle or peeling is not generated at molding, and contamination of a foreign matter is hardly generated.

In the laminated film in an embodiment of the present invention, it is preferable that the number of layers having a layer pair thickness of 10 nm or more and less than 220 nm is greater than the number of layers having a layer pair thickness of 220 nm or more and 320 nm or less. This makes it possible to realize a metal tone with little coloring. Herein, the layer pair thickness is a thickness obtained by adding respective layer thickness of a layer comprising the resin A (A layer) and a layer comprising the resin B (B layer) which are adjacent to each other. In addition, the layer pair thickness needs to be obtained by adding the thickness of an m-th A layer counted from one surface regarding only the A layer, and the thickness of an m-th B layer counted from the same surface regarding only the B layer. Herein, m represents an integer. For example, when layers are arranged in the order of A1 layer/B1 layer/A2 layer/B2 layer/A3 layer/B3 layer . . . from one surface to a surface on the opposite side, the A1 layer and the B1 layer is a first layer pair, the A2 layer and the B2 layer is a second layer pair, and the A3 layer and the B3 layer becomes a third layer pair. When the number of layers having a layer pair thickness of 10 nm or more and less than 220 nm is equal or smaller than the number of layers having a layer thickness of 220 nm or more and 320 nm or less, since a reflection ratio is more reduced on a low wavelength side in a reflection band of a wavelength band 400 nm to 1100 nm, an appearance becomes reddish and it is not preferable. This occurs since the density of a layer pair generating reflection on a low wavelength side becomes smaller. Therefore, it is preferable that the order of the layer pair thickness of layers constituting the laminated film is not such that the layer pair thickness is monotonously increased or decreased in an arithmetic sequence manner, but is such that the layer pair thickness is increased or decreased in a geometric sequence manner while satisfying the aforementioned condition. More preferably, it is preferable that the number of layers having a layer pair thickness of 120 nm or more and less than 220 nm is 1.05-fold or more and 2.5-fold or less the number of layers having a layer pair thickness of 220 nm or more and 320 nm or less. In this case, it is possible to realize a metal tone with no coloring.

It is preferable that the laminated film in an embodiment of the present invention has a tensile stress of 3 MPa or more and 90 MPa or less at 100% elongation in the film longitudinal direction and the width direction, in a tensile test at 150° C. In such the case, moldability becomes excellent, and it becomes easy to mold into an arbitrary shape in various moldings such as vacuum molding, vacuum air-pressure molding, plug assist vacuum air-pressure molding, in-mold molding, insert molding, cold molding, press molding, and draw molding. More preferably, in a tensile test at 150° C., a tensile stress at 100% elongation in the film longitudinal direction and the width direction is 3 MPa or more and 50 MPa or less. In such a case, molding becomes possible even at a higher drawing ratio. In order that a tensile stress at 100% elongation in the film longitudinal direction and the width direction is 3 MPa or more or 9 MPa or less in a tensile test at 150° C., it is preferable that the resin A is a crystalline resin, and the resin B is a non-crystalline resin having a bulky group such as cyclohexanedimethanol, spiroglycol, and neopentyl glycol. In such a case, since the resin B is hardly oriented and crystallized even after biaxial stretching, a tensile stress is lowered.

It is preferable that the dynamic friction coefficient of at least one side of the laminated film in an embodiment of the present invention is 0.5 or less. When the dynamic friction coefficient of the laminated film is 0.5 or less, since sliding with a mold used in molding becomes better, the moldability is further improved.

In the laminated film of an embodiment of the present invention, it is preferable that at least one side has a layer containing, as a main component, polyethylene terephthalate or polyethylene naphthalate of 3 μm or more. More preferably, at least one side has a layer containing, as a main component, polyethylene terephthalate or polyethylene naphthalate of 5 μm or more. It is further preferable that both sides have layers containing, as a main component, polyethylene terephthalate or polyethylene naphthalate of 3 μm or more. When there is no layer comprising polyethylene terephthalate or polyethylene naphthalate of 3 μm or more, a scratch becomes very easy to be seen when a surface has the scratch and it is not preferable.

In addition, in the laminated film of an embodiment of the present invention, functional layers such as an easily adhering layer, an easily sliding layer, a hard coat layer, an antistatic layer, an abrasion resistant layer, a reflection preventing layer, a color correcting layer, an ultraviolet absorbing layer, a printing layer, a metal layer, a transparent conductive layer, a gas barrier layer, a hologram layer, a peeling layer, a pressure-sensitive adhesive layer, an emboss layer, and an adhesive layer may be formed on the surface thereof. In one embodiment, the molding of the present invention needs to include the laminated film. It is preferable that the molding includes any of a hard coat layer, an emboss layer, a weather resistant layer (UV cut layer), a colored layer, an adhesive layer, and a substrate resin layer in addition to the laminated film of an embodiment of the present invention. Since such a molding can be all composed of polymers, and does not include a metal or heavy metal, the molding has a low environmental burden, and excellent recycling property and radio wave permeability. It is preferable that the molding of the present invention in one aspect has particularly a colored layer. In the laminated film in an embodiment of the present invention, since a portion of visible light beam is transmitted in some cases, it becomes possible to adjust a color tone of the molding by providing a colored layer. In addition, since various molding methods such as vacuum molding, vacuum air-pressure molding, plug assist vacuum air-pressure molding, in-mold molding, insert molding, cold molding, press molding, and draw molding can be applied, it is possible to obtain the molding at a low cost. Such a molding can be preferably used in cellular phones, telephones, personal computers, audio instruments, household electric appliances, wireless communication instruments, radomes, automobile interior and exterior decoration parts, construction materials, game machines, amusement instruments, packaging containers and the like. Particularly, it is preferable to use the molding of the present invention as a decoration part of instruments having the function of wireless information communication (wireless information communication instruments) such as cellular phones, telephones, personal computers, audio instruments, household electrical appliances, wireless communication instrument, automobile-mounting parts such as radomes, and game machines. Since the molding of the present invention is excellent in radio wave permeability while having a metal tone appearance, it does not cause electromagnetic wave interference like conventional metal tone decoration materials. For this reason, when the molding of the present invention is used as a decoration part of information communication instruments, miniaturization and thinning of the instruments becomes possible, and a freedom degree of circuit design in the interior of the information communication instruments is increased.

In addition, the laminated film of an embodiment of the present invention can be also utilized as a half-mirror. The half-mirror serves as a mirror under a certain condition, and serves as a transparent body under the other condition. In order that the film serves as a mirror, light is adjusted so that transmitted light is extremely reduced. When the laminated film in an embodiment of the present invention is used as a half-mirror, it is preferable that an average relative reflection ratio at a wavelength band 400 nm to 1000 nm of the laminated film is 30% or more and 70% or less. In addition, it is also preferable that the laminated film in an embodiment of the present invention is used by integrally molding with a transparent resin. Furthermore, it is also possible to form a portion which serves as a mirror and a portion which serves as a half-mirror simultaneously, by providing a light shielding layer on a portion on at least one side of the laminated film in an embodiment of the present invention. That is, the portion where the light shielding layer is provided serves as a mirror since transmission of light is not continuously generated. On the other hand, a portion where the light shielding layer is not provided serves as a half-mirror. Herein, as the light shielding layer, a method of forming a black layer by printing or the like is convenient. Such a half-mirror can be preferably used in cellular phones, telephones, personal computers, audio instruments, household electrical appliances, wireless communication instruments, automobile-mounting parts, construction materials, game machines, amusement instruments, packing containers and the like.

The circuit-mounting sheet in an embodiment of the present invention needs to include at least the aforementioned laminated film and a conductive pattern layer. Since the laminated film in an embodiment of the present invention is composed of a polymer while having a metal tone appearance, it has no conductivity. Therefore, even when a conductive pattern layer is formed, it functions as a circuit without a problem. Herein, the conductive pattern layer refers to a fine pattern formed by etching of a metal foil, printing or depositing of a metal paste, or etching of a sputtered film. In addition, a metal wire which is used as an antenna and a metal deposited film are also included. As a conductive substance, copper, aluminum, and silver are preferable. Particularly, in view of transmission/reception properties, copper is most preferable. On the other hand, from the viewpoint of low cost, a silver paste is preferable which can form a conductive pattern by a printing manner and low temperature thermal treatment. These conductive pattern layers have a function as an antenna or a circuit.

The conductive pattern layer in an embodiment of the present invention may be directly formed on the surface of the laminated film of the present invention. Alternatively, a method of providing a conductive pattern layer on the surfaces of various heat-resistance films such as a polylimide film, a polylphenylene sulfide film, a liquid crystal film, a polyethylene naphthalate film, a polyethylene terephthalate film, an alicyclic polyolefin film, a PETG film, an ABS film, and a PVC film, and bonding the film and a laminated film with an adhesive or a pressure-sensitive adhesive is preferable.

On the other hand, it is preferable that the circuit-mounting sheet in an embodiment of the present invention has a colored layer. The colored layer refers to a layer in which a pigment or a dye is dispersed for coloring, in a resin-coated layer, in a pressure-sensitive adhesive layer, or in a film sheet. The color thereof is not particularly limited, and can be variously selected in view of design property, and particularly preferably is black. In this case, since a color reflected by the laminated film can be seen emphatically, not only design property becomes excellent, but also hiding property is increased and, therefore, it becomes easy to hide the circuit.

In addition, it is also preferable that the laminated film constituting the circuit-mounting sheet in an embodiment of the present invention has a steric shape. That is, since a preferable laminated film in an embodiment of the present invention can be molded while having high metal tone design property, a circuit having a complicated shape can be also manufactured. For example, when a pattern in which a copper wire antenna coil is inserted is formed on the laminated film by vacuum air-pressure molding, it becomes possible to very simply position the antenna coil. In addition, in this case, a metal tone design in which a portion of an antenna is raised can be obtained.

In the circuit-mounting sheet in an embodiment of the present invention, it is preferable that the laminated film has a saturation water content of 1.0% or less. When the saturation water content is more than 1.0%, upon being prepared into a non-contact type IC card, the film may influence on receiving property in some cases. In addition, also upon using as a circuit, when the saturation water content is more than 1.0%, a distance between circuits may be changed, and deteriorated insulation may be generated by influence of a humidity expansion coefficient in some cases. The IC card and the IC label in an embodiment of the present invention need to include the circuit-mounting sheet. It is also preferable that, in addition to the circuit-mounting sheet in an embodiment of the present invention, any of a hard coated layer, an emboss layer, a weather resistant layer (UV cut layer), a colored layer, and an adhesive layer is contained. Since such an IC card and an IC label are such that a substrate of the circuit is composed only of a polymer, and does not include a metal or heavy metal, they have a low environmental burden, and excellent recycling properties, and do not cause radio wave interference.

Since various molding methods such as vacuum molding, vacuum air-pressure molding, plug assist vacuum air-pressure molding, in-mold molding, insert molding, cold molding, and press molding can be applied to the IC card and the IC label in an embodiment of the present invention, a steric shape can be formed at a low cost. The IC card and the IC label in an embodiment of the present invention is suitable in a wireless IC card and a wireless IC label, and an RFID tag having a high quality sense can be provided.

In the laminated film in an embodiment of the present invention, it is preferable that a band width of a reflection band having a reflection ratio of 30% or more is 3000 nm or more. In such a case, a film having high lightness and high luminance can be easily obtained.

In addition, in the laminated film in an embodiment of the present invention, it is preferable that at least one side of the laminate film has a cross-linking ink layer having a thickness of 15 µm or more and 80 µm or less. When one side has a cross-linking ink layer having a thickness of 15 µm or more and 80 µm or less, the bending phenomenon of a layer of a multilayered laminated film at insert molding can be further suppressed, and it becomes easy to reduce WashOut even by injection of a resin such as polycarbonate at a high temperature. When the thickness is less than 15 μm, WashOut is easily produced at molding and, when the thickness is more than 80 μm, a problem of curling or the like is generated at printing.

Herein, it is preferable that the cross-linking ink layer is a two-component ink layer comprising a resin component having a hydroxyl group, and a cross-linking agent component. Examples of the resin component having a hydroxyl group preferably include a hydroxyl group-containing polyester resin, a hydroxyl group-containing polyurethane resin, and a hydroxyl group-containing poly(meth) acryl resin are preferable. Examples of the cross-linking agent component preferably include polyfunctional isocyanate compounds. In addition, it is preferable that a coloring agent is contained and, examples of the coloring agent include a white pigment, a black pigment, other color pigments, a light-storing pigment, a BL pigment, a fluorescent pigment, a holographic pigment, a pearl pigment, an alumina flake pigment coated with a metal oxide, a silica flake pigment coated with a metal oxide, and a liquid crystal pigment. The cross-linking ink layer in an embodiment of the present invention may be formed by mixing the resin component having a hydroxyl group and containing a coloring agent as described above, and the cross-linking agent component which reacts with the functional group to form a cross-linked structure prior to printing, performing printing, thereafter, holding the layer at a constant temperature, and promoting cross-linking of the layer. In the conventional insert molding, since a transparent film was used, fine deformation in the interior of the film does not become problematic, but in the case of a multilayered laminated film, since fine deformation in the layer appears as discoloration, this becomes a problem. In one aspect of the present invention, it is found out that fine deformation in the interior of the film can be suppressed by coating the cross-linking ink layer in the thickness of 15 μm or more and 80 μm or less on a film of a preferable aspect of the present invention, and whereby, it becomes easy to suppress a discoloration phenomenon peculiar to the multilayered laminated film.

Then, a preferable process of producing the laminated film in an embodiment of the present invention will be described below. Two kinds of resins A and B are prepared in the form of pellets. The pellets are dried in hot air or under vacuum if necessary, and are supplied to separate extruders. In the extruder, a resin which has been heated to melt at a melting point or higher is uniformized in an extrusion amount thereof with a gear pump or the like, and a foreign matter and a denatured resin are removed through a filter or the like.

The resins A and B which have been discharged from different flow paths using these two or more extruders are then fed into a multilayer laminating apparatus. Examples of the multilayer laminating apparatus include a multi manifold die, a feed block and a static mixer and, particularly, in order to obtain the constitution of the present invention effectively, it is preferable to use a feed block containing at least two members having a number of fine slits, separately.

When such a feed block is used, the apparatus does not become an extremely large scale, a foreign matter due to thermal degradation is small and, even when the lamination number is extremely large, lamination at high precision becomes possible. In addition, the lamination precision in the width direction is considerably improved as compared with the prior art. In addition, it also becomes possible to form a constitution of an arbitrary layer thickness. In this apparatus, since the thickness of each layer can be adjusted with a shape (length, width, gap) of a slit, it becomes possible to attain an arbitrary layer thickness. For this reason, it becomes possible to easily attain a layer constitution, which is a feature in the present application. On the other hand, in the conventional apparatus, in order to attain lamination of 300 or more layers, it was general to use a square mixer in combination, but in such a method, since a lamination flow is deformed and laminated in a similar figure, it was difficult to attain an arbitrary layer thickness.

In an embodiment of the present invention, the change of the thickness from a thin layer to a thick layer, or the change of the thickness from a thick layer to a thin layer becomes very steep as compared with the conventional multilayered laminated film. This is because the change of the layer thickness in a film is a one-step slant structure in the prior art, while the change is a two or more-step slant structure in the present application. A thoughtless increase in the layer number leads to a reduction in lamination precision, but it was impossible in the prior art to obtain the two or more-step slant structure while maintaining the layer number. In one aspect of the present invention, it is particularly preferable to adjust each flow rate corresponding to the thickness of each layer with a slit gap using a feed block containing at least two members having a number of fine slits separately and, in this case, it may be good that the interval precision of each slit gap is ±10 μm or less. By using such an especial feed block, it becomes possible to form a high precision and two or more-step slant structure.

The laminated film in an embodiment of the present invention allows reflection of light, and the reflection ratio is controlled by a difference in a refraction index between a layer comprising the resin A and a layer comprising the resin B, and the layer number.

$$2\times(na\cdot da+nb\cdot db)=\lambda \quad \text{Equation 1}$$

na: in-plane average refraction index of layer comprising resin A
nb: in-plane average refraction index of layer comprising resin B
da: thickness of layer comprising resin A (nm)
db: thickness of layer comprising resin B (nm)
λ: main reflection wavelength (primary reflection wavelength)

Now, a melt laminate which has been formed into a desired layer constitution in this manner is then molded into an objective shape with a die, and is discharged. A multilayered laminated sheet which has been discharged through a die is extruded on a cooling body such as a casting drum, cooled and solidified to obtain a casting film. In this case, it is preferable to rapidly cool and solidify the sheet by closely adhering to a cooling body such as a casting drum with an electrostatic force using a wire-like, tape-like, needle-like or knife-like electrode. Alternatively, a method of rapidly cooling and solidifying the sheet by closely adhering to a cooling body such as a casting drum by blowing out the air from a slit-like, spot-like or planar apparatus, or a method of rapidly cooling and solidifying the sheet by closely adhering to a cooling body with a nip roll is also preferable.

It is preferable that the thus obtained casting film is biaxially stretched, if necessary, and biaxial stretching refers to stretching in the longitudinal direction and the width direction. Stretching may be sequential stretching in two directions, or stretching in two directions simultaneously. In addition, re-stretching may be further performed in the longitudinal direction and/or the width direction. Particularly, in one aspect of the present invention, it is preferable to use simultaneous biaxial stretching in that a difference in in-plane orientation can be suppressed, and a surface scratch can be suppressed.

First, the case of sequential biaxial stretching will be described. Herein, stretching in the longitudinal direction refers to stretching for imparting molecular orientation in the longitudinal direction to the film and, usually, is performed by a difference in the circumferential velocity difference of a roll, and this stretching may be performed at a one-step, or may be performed at a multi-step using a plurality of roll pairs. A stretching ratio is different depending on a kind of a resin and, usually, preferably 2 to 15-fold and, when polyethylene terephthalate is used in any resin constituting the laminated film, 2 to 7-fold is particularly preferably used. In addition, a stretching temperature is preferably from a glass transition temperature of a resin constituting the laminated film to a glass transition temperature +100° C.

After the thus obtained monoaxially stretched film is subjected to surface treatment such as corona treatment, flame treatment and plasma treatment, if necessary, and then functions such as easy sliding property, easy adhering property and antistatic property may be imparted to the film by in-line coating.

Stretching in the width direction refers to stretching for imparting orientation in the width direction to the film and, usually, the film is stretched in the width direction by conveying the film while grasping both ends of the film with a clip using a tenter. A stretching ratio is different depending on a kind of a resin and, usually, 2 to 15-fold is preferable and, when polyethylene terephthalate is used in any resin constituting the laminated film, 2 to 7-fold is particularly preferably used. In addition, a stretching temperature is preferably from a glass transition temperature of a resin constituting the laminated film to a glass transition temperature +120° C.

It is preferable that the thus biaxially stretched film is subjected to thermal treatment at the stretching temperature or higher and the melting point or lower in a tenter in order to impart planarity and dimensional stability. After being subjected to thermal treatment like this, the film is uniformly gradually cooled, and cooled to room temperature, and wound. Alternatively, if necessary, relaxing treatment may be carried out in combination upon thermal treatment to gradual cooling.

Next, the case of simultaneous biaxial stretching will be described. In the case of simultaneous biaxial stretching, after the resulting cast film is subjected to surface treatment such as corona treatment, flame treatment, and plasma treatment, if necessary, and then functions such as easy sliding property, easy adhering property, and antistatic property may be imparted by in-line coating.

Then, the cast film is guided to a simultaneous biaxial tenter, and simultaneously and/or stepwisely stretched in the longitudinal direction and the width direction by conveying the film while grasping both ends of the film with a clip. Examples of a simultaneous biaxial stretching machine include a pantagraph system, a screw system, a driving motor system, and a linear motor system, and a driving motor system or a linear motor system which can change a stretching ratio arbitrarily, and can perform relaxing treatment at an arbitrary site is preferable. A stretching ratio is different depending on a kind of a resin and, usually, 6 to 50-fold as an area ratio is preferable and, when polyethylene terephthalate is used in any resin constituting the laminated film, 8 to 30-fold as an area ratio is particularly preferably used. Particularly, in the case of simultaneous biaxial stretching, in order to suppress a difference in an in-plane orientation, it is preferable to adjust stretching ratios in the longitudinal direction and the width direction to the same, and adjust stretching rates to approximately equal. In addition, a stretching temperature is preferably from a glass transition temperature of a resin constituting the laminated film to a glass transition temperature +120° C.

It is preferable that the thus biaxially stretching film is subsequently subjected to thermal treatment at the stretching temperature or higher and the melting point or lower in a tenter in order to impart planarity and dimensional stability. Upon this thermal treatment, in order to suppress distribution of a main orientation axis in the width direction, it is preferable to perform relaxing treatment instantly in the longitudinal direction immediately before and/or immediately after entering into a thermal treatment zone. After being subjected to thermal treatment like this, the film is uniformly gradually cooled, and cooled to room temperature and wound. Alternatively, if necessary, upon thermal treatment to gradual cooling, relaxing treatment may be performed in the longitudinal direction and/or the width direction. The film is subjected to relaxation treatment instantly in the longitudinal direction immediately before and/or immediately after entering into a thermal treatment zone.

EXAMPLES

A method of assessing physical property values used in the present invention will be described.
(Method of Assessing Physical Property Value)
(1) Layer Constitution A layer constitution of a film was obtained by observation with an electron microscope, regarding a sample whose cross section had been cut out using a microtome. That is, using a transmission electron microscope Model H-7100FA (manufactured by Hitach, Ltd.), the cross section of the film was observed at a magnification of 40000 at an acceleration voltage of 75 kV, a cross section photograph was taken, and a layer constitution and each layer thickness were measured. In the present examples, the cross section was stained using known $RuO_4$ in order to obtain a high contrast.

A specific method to obtain a laminated structure will be described. A TEM photographic image at a magnification of about 40000 was taken at an image size of 720 dpi using CanonScanD123U. The image was stored in a JPEG manner, and then this JPG file was opened, and image-analyzed using an image processing software, Image-Pro Plus ver.4 (distribution source: Planetron. Inc.). For image analysis processing, a relationship between a position in the thickness direction and an average brightness of a region held by two lines in the width direction was red out as a numerical value in a vertical thick profile mode. Using a table calculation software (Excel2000), data of a position (nm) and brightness was subjected to numerical value processing of 3 points movement average at a sampling step 6 (thinning out 6). Further, the obtained data in which the brightness is periodically changed is differentiated, the maximum value and the minimum value of the differentiation curve were red out and, a layer thickness was calculated by allowing an interval between adjacent values to be a layer thickness of one layer. This operation was performed for every photograph, and layer thicknesses of all layers were calculated.

(2) Inherent Viscosity

An inherent viscosity was calculated from a solution viscosity measured at 25° C. in orthochlorophenol. In addition, the solution viscosity was measured using an Ostwald viscometer. A unit was indicated in [dl/g]. The number of replication was 3, and an average thereof was adopted.

(3) Peeling Test

A test was performed according to JIS K5600 (2002). The film was regarded as a hard basis material, and 25 lattice-like patterns were engraved at an interval of 2 mm. In addition, a tape which had been cut into a length of about 75 mm was adhered to a portion of a lattice, and the tape was peeled at an angle near 60° for a time of 0.5 to 1.0 second. Herein, as the tape, Sellotape (registered trademark) No. 252 (width 18 mm) manufactured by Sekisui Chemical Co., Ltd. was used. The assessment result was expressed by the number of lattices, a whole of each of which was completely peeled.

(4) Glass Transition Temperature

Using differential scanning calorimetry (DSC), a glass transition temperature was measured and calculated according to JIS K 7122 (1987). First, at $1^{st}$ Run, a temperature was raised from 25° C. to 290° C. at 20° C./min., and held at 290° C. for 5 minutes, followed by rapid cooling to 25° C. Subsequently at 2nd Run, a temperature was raised from 25° C. to 290° C. at 20° C./min. As a glass transition temperature of a resin, the glass transition temperature at $2^{nd}$ Run was used.
Apparatus: "Robot DSC-RDC220" manufactured by Seiko Instruments Inc.
Data analysis "Disk session SSC/5200"
Sample mass: 5 mg (5) Lightness, Chromaticity, Chroma, Employing a spectroscopic colorimeter CM-3600d manufactured by Konika Minolta Sensing, Inc., a film having a product width of 1 m was measured for lightness L* and chromaticity (a*,b*) at each point at an interval of 10 cm in the width direction. Chroma was obtained from the resulting chromaticity, and a difference between the maximum value and the minimum value of the chroma was defined as the range of the chroma. As a procedure for measurement, zero calibration of a reflection ratio was performed with a zero calibration box attached to a spectroscopic colorimeter, subsequently, 100% calibration was performed using an attached white calibration plate, and the lightness L* and the chromaticity (a*,b*) of the film were measured under the following condition.
Mode: Reflection, SCI/SCE simultaneous measurement, measurement diameter: 8 mm
Sample: Coating non-measurement side with black ink Then, chroma C* was obtained from the chromaticity (a*, b*). Definition of chroma was as follows. As the chroma is closer to 0, coloring disappears.

$$C^* = ((a^*)^2 + (b^*)^2)^{1/2}$$

As the chromaticity (a*,b*) used for calculating the chroma, a value of SCI is used.

(6) Color Difference

Using an angle variable absolute reflection ratio attached apparatus (20 to 60°) in a spectrophotometer U4100 manufactured by Hitachi High-Technologies Corporation, an absolute reflection ratio at each of 20°, 30°, 40°, 50° and 60° at a central position in the width direction of a film product width of 1 m was measured. Measuring conditions were as follows.
Detection rate: Wavelength 240 to 850 nm is 600 nm/min
  Wavelength 850 to 1750 nm is 750 nm/min
Sampling interval: 1.00 nm
Slit: wavelength 240 to 850 nm is 2.00 nm
  Wavelength 850 to 1750 nm is automatically controlled
PbS sensitivity: 2

From the P wave and the S wave of a spectroscopic reflection curve at each of angles 20°, 40° and 60°, a spectroscopic reflection curve as an average thereof was obtained. Then, from the average spectroscopic reflection curve of each angle, L*, a* and b* of 10° field were calculated using D65 as a light source, and an angle-dependent color difference ΔEab was obtained from the following equations.

$$\Delta Eab_{(40°\leftarrow 20°)} = (a^*_{(40°)} - a^*_{(20°)})^2 + (b^*_{(40°)} - b^*_{(20°)})^2)^{1/2}$$

$$\Delta Eab_{(60°\leftarrow 40°)} = ((a^*_{(60°)} - a^*_{(40°)})^2 + (b^*_{(60°)} - b^*_{(40°)})^2)^{1/2}$$

$$\Delta Eab = \Delta Eab_{(40°\leftarrow 20°)} + \Delta Eab_{(60°\leftarrow 40°)}$$

Wherein, a*(n):a* at angle n°
b*(n):b* at angle n°

(7) Electromagnetic Wave Shielding Property

According to ASTM D4935, electromagnetic wave permeability at 45 M to 3 GHz was measured by coaxial tube-type shielding effect measuring system of keycom Corp. With respect to examples and comparative examples, loss at 2.4 GHz was described.

(8) Interference Pattern

A laminated film having a size of 500 mm in length and 500 in width was placed on a black cardboard, this was irradiated with 3 wavelengths florescent lamp, and an interference pattern was determined by visual observation based on the following criteria.
x: an interference pattern is clearly seen
Δ: an interference pattern is slightly seen
◦: an interference pattern is hardly seen Example 1

1. Synthesis of Resin B

Each of 56.1 parts by weight of dimethyl terephthalate, 24.8 parts by weight of dimethyl 1,4-cyclohexanedicarboxylate having a cis/trans ratio of 72/28, 47.2 parts by weight of ethylene glycol, 33.5 parts by weight of spiroglycol, 0.04 parts by weight of manganese acetate tetrahydrate, and 0.02 parts by weight of antimony trioxide was weigh and placed into a transesterification reaction apparatus. The content was dissolved at 150° C. to be stirred. Then, a temperature of a reaction content was slowly raised to 235° C. with stirring to distill methanol. After a predetermined amount of methanol was distilled, an ethylene glycol solution containing 0.02 parts by weight of trimethylphosphoric acid was added thereto. After trimethylphosphoric acid was added thereto, the mixture was stirred for 10 minutes to complete a transesterification reaction. Thereafter, the transesterification reaction product was transferred to a polymerization apparatus.

Then, pressure was reduced and a temperature was raised while stirring the content in the polylmerization apparatus, and polymerization was conducted while distilling ethylene glycol. For reducing pressure, pressure was reduced from normal pressure to below 133 Pa over 90 minutes and, for raising a temperature, a temperature was raised from 235° C. to 285° C. over 90 minutes. When a stirring torque of the polymerization apparatus reached a predetermined value, the interior of the polymerization apparatus was returned to normal pressure with a nitrogen gas, and a valve at a lower part of the polymerization apparatus was opened to discharge a gut-like polymer into a water tank. A polyester gut which had been cooled in the water tank was cut into chips with a cutter to obtain a resin B.

The resulting resin B was a copolymerized polyester (PE/SPG•T/CHDC) having an inherent viscosity of 0.72, and was an amorphous resin. The dicarboxylic acid component of this resin B was such that terephthalic acid was 70 mol %, and cyclohexanedicarboxylic acid was 30 mol %. In addition, the diol component of the resin B was such that ethylene glycol was 75 mol % and spiroglycol was 25 mol %.

2. Synthesis of Resin A

A resin A was polymerized in the same manner as that described above except that 100 parts by weight of dimethyl terephthalate, and 64 parts by weight of ethylene glycol were used. The resin A was polyethylene terephthalate (PET) having an inherent viscosity of 0.65 and was a crystalline resin.

As two kinds of thermoplastic resins, the resin A and the resin B were prepared. The resins A and B were formed into a melted state at 280° C., respectively, with a separate biaxial extruder with a bent, and then were joined in a feed block of 901 layers having three separate members including 301 slits via a gear pump and a filter. Herein, it was arranged that both superficial layer portions were the resin A, the resin A and the resin B were alternately laminated, and the layer thicknesses of a layer comprising the resin A and a layer comprising the resin B which were adjacent to each other were approximately the same. Subsequently, after the resins were guided to a T-die to mold into a sheet form, it was rapidly cooled and solidified on a casting drum held at a surface temperature of 25° C. by electrostatic application to obtain a cast film.

The resulting cast film was heated with a roll group set at 75° C., stretched at 3.3-fold in the longitudinal direction during a stretching section length of 100 mm while rapidly heating from both sides of the film with a radiation heater and, thereafter, once cooled. Subsequently, both sides of this monoaxially stretched film were subjected to corona discharge treatment in the air, the wetting tension of a substrate film was made to be 55 mN/m, a coating solution for forming a laminated film comprising (polyester resin having glass transition temperature of 18° C.)/(polyester resin having glass transition temperature of 82°)/silica particles having an average particle diameter of 100 nm was coated on the treated surfaces to form a transparent, easily sliding and easily adhering layer.

This monoaxially stretched film was guided to a tenter, pre-heated with hot air at 100° C., and stretched at 3.5-fold in the transverse direction at a temperature of 110° C. The stretched film, as it was, was subjected to heat treatment with hot air at 240° C. in the tenter, subsequently, subjected to relaxing treatment 7% in the width direction at the same temperature and, thereafter, the film was gradually cooled to room temperature, and wound. The thickness of the resulting film was 100 μm. The designed layer thickness of this film was the same as in FIG. 1, and the layer thickness of each layer was controlled by adjusting a slit gap. The obtained results are shown in Table 1.

Example 2

Example 2 was performed in the same manner as in Example 1 except that polyethylene naphthalate (PEN) having an inherent viscosity of 0.67 was used as the resin A. The thickness of the resulting film was 100 μm. The obtained results are shown in Table 1. The resin A of Example 2 was polymerized in the same manner as in the resin A of Example 1 except that 100 parts of dimethyl 2,6-naphthalanedicarboxylate and 60 parts of ethylene glycol were used.

Example 3

Example 3 was performed in the same manner as in Example 1 except that a polycarbonate resin (PC), TARFLON LC1700 manufactured by Idemitsu Kosan Co., Ltd., was used as the resin A, and a polymethyl methacrylate resin (PMMA), SUMIPEX LG2 manufactured by Sumitomo Chemical Co., Ltd., was used as the resin B. The thickness of the resulting film was 100 μm. The obtained results are shown in Table 1.

Example 4

Figure 2:
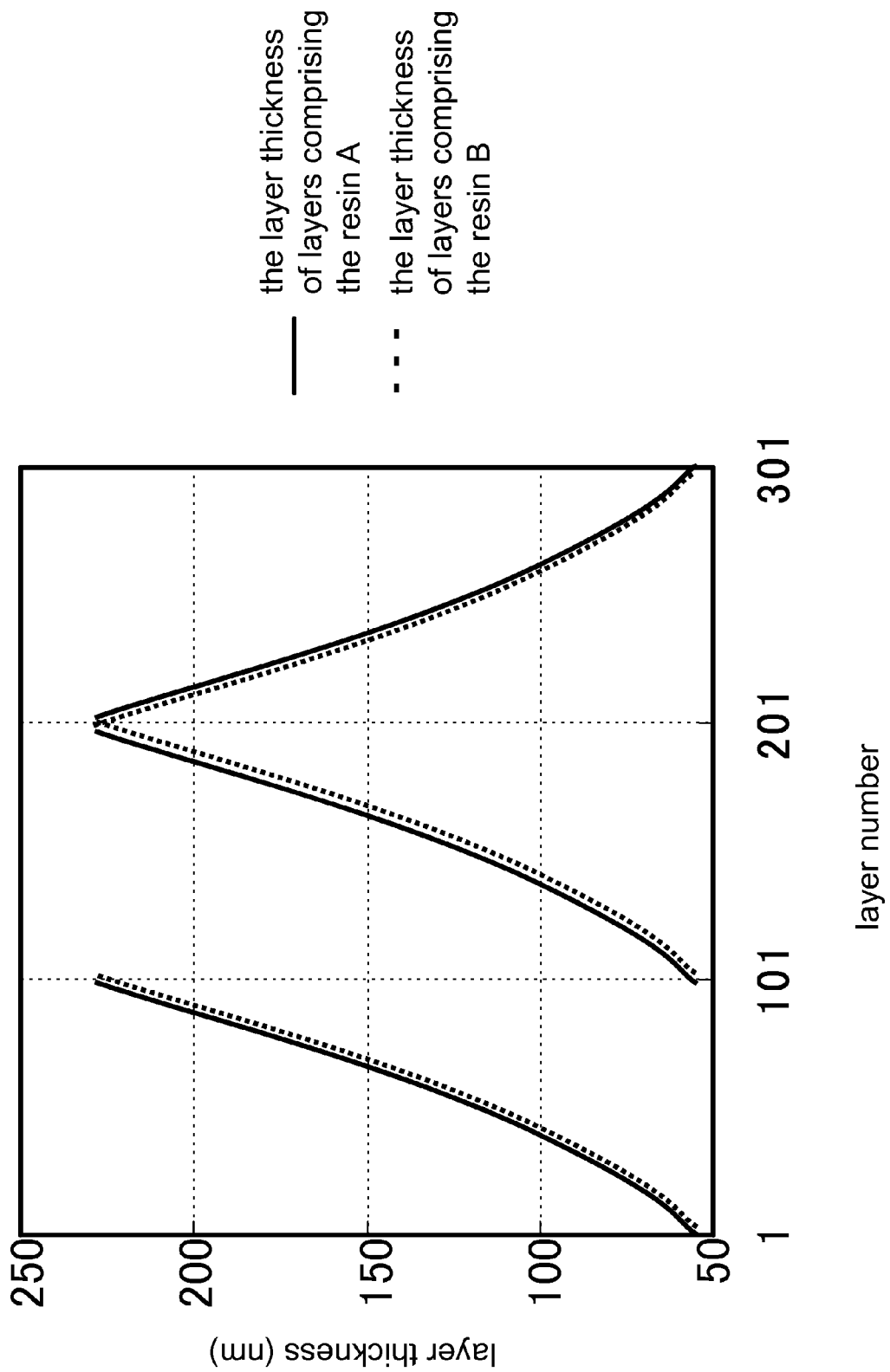

Example 4 was performed in the same manner as in Example 2 except that a feed block of 301 layers having two separate members including 151 slits was used, and the designed layer thickness was changed as in FIG. 2. The thickness of the resulting film was 100 μm. The obtained results are shown in Table 1.

Example 5

Example 5 was performed in the same manner as in Example 4 except that polyethylene naphthalate (PEN) having an inherent viscosity of 0.67 was used as the resin A, and a polymethyl methacrylate resin (PMMA), SUMIPEX LG2 manufactured by Sumitomo Chemical Co., Ltd., was used as the resin B. The thickness of the resulting film was 100 μm. The obtained results are shown in Table 1.

Examples 6 to 8

Each of Examples 6 to 8 was performed in the same manner as in Example 1 except that the slit shape and the like of a feed block were changed so that the designed layer thickness was the same as in FIG. 3 to FIG. 5, and the thickness was adjusted. The obtained results are shown in Table 1.

Comparative Examples 1 to 2

Figure 7:
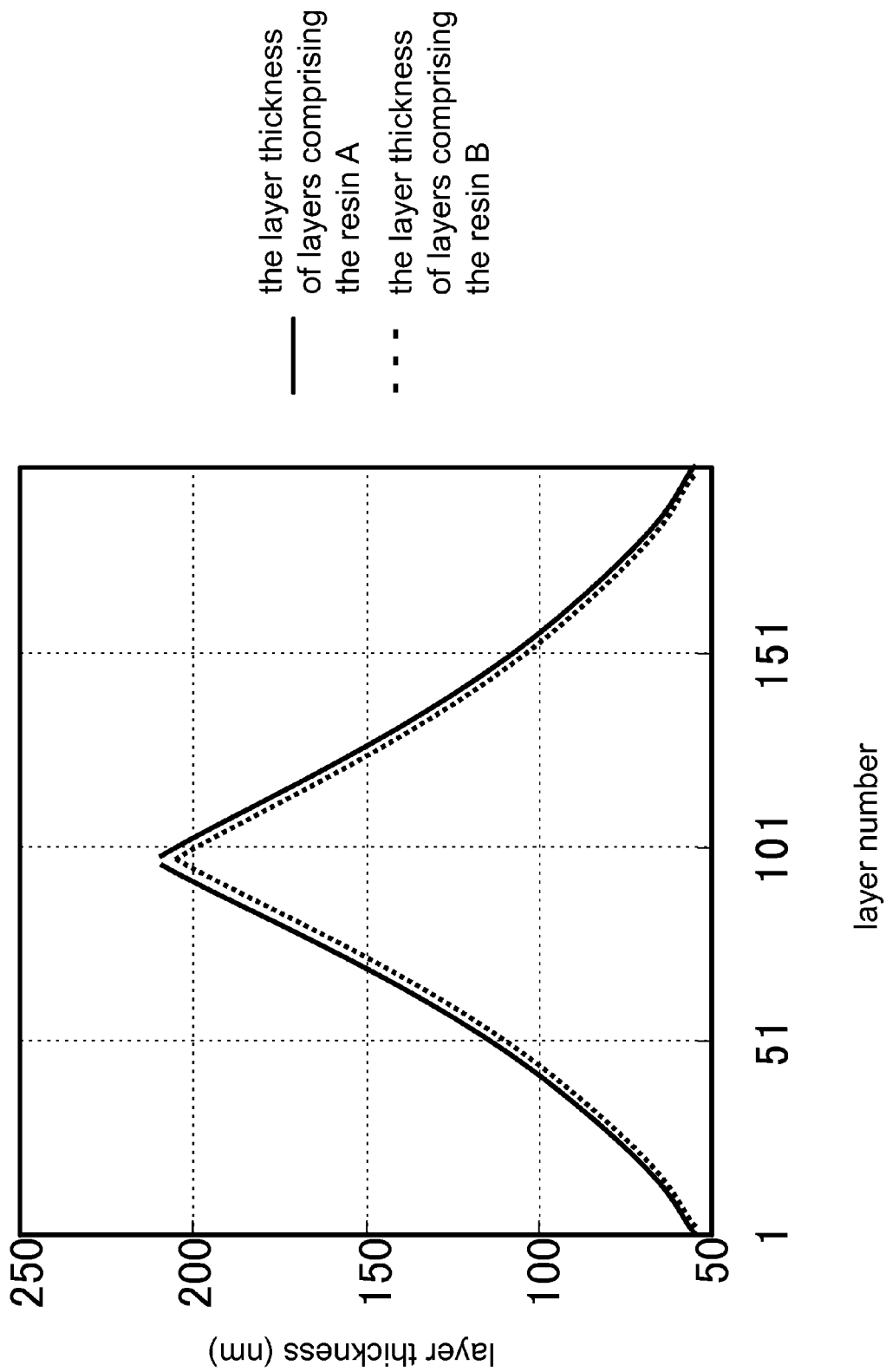
Figure 8:
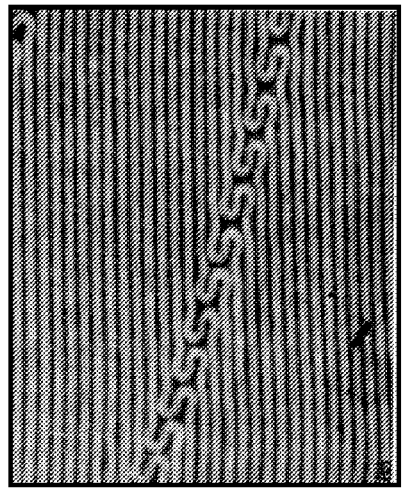
Figure 8:
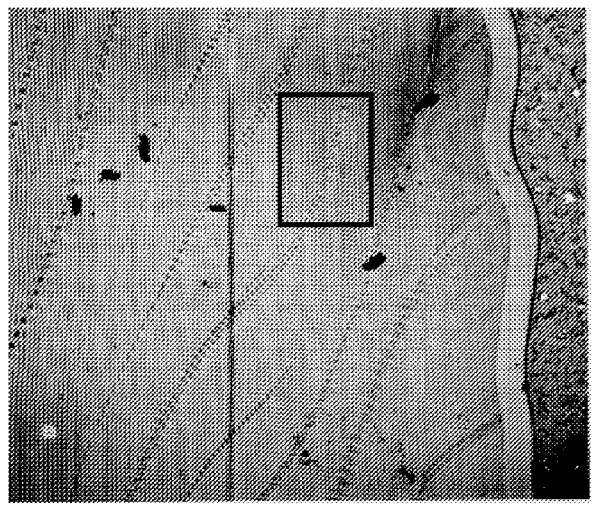

Each of Comparative Examples 1 to 2 was performed in the same manner as in Example 1 except that the slit shape and the like of a feed block were changed so that the designed layer thickness was the same as in FIG. 6 to FIG. 7, and the thickness was adjusted. The obtained results are shown in Table 2.

Comparative Example 3

After a black cross-linking ink layer was formed on one side (layer number 1 side) of the laminated film obtained in Comparative Example 1 by screen printing, a binder layer was formed. Printing conditions were as follows. The thickness of the cross-linking ink layer was 5 μm.
<Black Cross-Linking Ink Layer>
Coloring pigment: Carbon black MA100 manufactured by Mitsubishi Chemical Corporation, 8 parts by weight
Polyester polyol resin: VYLON 200 manufactured by TOYOBO CO., LTD., 25 parts by weight
Solvent: Cyclohexane 35 parts by weight
Cross-linking agent: Isocyanate-based crosslinking agent, Collonate 2096 manufactured by NIPPON POLYURETHANE INDUSTRY CO., LTD, 10 parts by weight
Screen mesh: T-225
Drying: 80° C.×10 min (box drying)
Coating time: One time
<Binder>
Binder: IMB-003 manufactured by Teikoku Printing Inks Mfg. Co., Ltd.
Screen mesh: T-225
Drying: 90° C.×60 min (box drying)

Then, the film on which the cross-linking ink layer and the binder layer had been formed was cut into a predetermined dimension, set into a mold, and insert-molded under the following conditions. In the resulting molding, discoloration called WashOut was seen at a gate portion. Regarding the discoloration portion, when the cross section of the film was observed, bending deformation of the layer of FIG. 8 was recognized. In addition, warping having a height of around 0.5 mm was generated.
Closing pressure: 60 ton
Mold temperature: 60° C.
Molding resin: PC/ABS alloy SD Polyca IM6011 manufactured by Sumitomo Dow Limited
Molding resin temperature: 260° C.
Injection rate: 50 mm/s
Molded product dimension (L×W×H): 60×60×3 mm
Gate: φ2 mm pin gate Example 9

After a black cross-linking ink layer was formed on one side (layer number 1 side) of the laminated film obtained in Example 1 by screening printing, a binder layer was formed. Printing conditions were as follows. The thickness of the cross-linking layer was 5 μm.
<Black Cross-Linking Ink Layer>
Coloring pigment: Carbon black MA100 manufactured by Mitsubishi Chemical Corporation, 8 parts by weight
Polyester polyol resin: VYLON 200 manufactured by TOYOBO CO., LTD., 25 parts by weight
Solvent: Cyclohexane 35 parts by weight
Cross-linking agent: Isocyanate-based crosslinking agent, Collonate 2096 manufactured by NIPPON POLYURETHANE INDUSTRY CO., LTD, 10 parts by weight
Screen mesh: T-225
Drying: 80° C.×10 min (box drying)
Coating time: One time
<Binder>
Binder: IMB-003 manufactured by Teikoku Printing Inks Mfg. Co., Ltd.
Screen mesh: T-225
Drying: 90° C.×60 min (box drying)
Then, the film on which the cross-linking ink layer and the binder layer had been formed was cut into a predetermined dimension, set in a mold, and insert-molded under the following conditions. In the resulting molding, bending deformation of a layer was not observed, there was no discoloration called WashOut at a gate portion, and the appearance was excellent. In addition, there was little warping.
Closing pressure: 60 ton
Mold temperature: 60° C.
Molding resin: PC/ABS alloy SD Polyca IM6011 manufactured by Sumitomo Dow Limited
Molding resin temperature: 260° C.
Injection rate: 50 mm/s
Molded product dimension (L×W×H): 60×60×3 mm
Gate: φ2 mm pin gate Comparative Example 4

After a black cross-linking ink layer was formed on one side (layer number 1 side) of the laminated film obtained in Comparative Example 1 by screening printing, a binder layer was formed. Printing conditions were as follows. The thickness of the cross-linking layer was 5 μm.
<Black Cross-Linking Ink Layer>
Coloring pigment: Carbon black MA100 manufactured by Mitsubishi Chemical Corporation, 8 parts by weight
Polyester polyol resin: VYLON 200 manufactured by TOYOBO CO., LTD., 25 parts by weight
Solvent: Cyclohexane 35 parts by weight
Cross-linking agent: Isocyanate-based crosslinking agent, Collonate 2096 manufactured by NIPPON POLYURETHANE INDUSTRY CO., LTD, 10 parts by weight
Screen mesh: T-225
Drying: 80° C.×10 min (box drying)
Coating time: One time
<Binder>
Binder: IMB-003 manufactured by Teikoku Ink Teikoku Printing Inks Mfg. Co., Ltd.
Screen mesh: T-225
Drying: 90° C.×60 min (box drying)
Then, the film on which the cross-linking layer and the binder layer had been formed was cut into a predetermined dimension, set in a mold, and insert-molded under the following conditions. In the resulting molding, discoloration of the film was observed around a gate portion and, at the same time, ink flowing was also observed. When the cross section of the film at a side where ink flowing had been seen was observed, the layer number was decreased, and the film thickness became small and, at the same time, bending deformation of the layer was also recognized. In addition, warping having a height of around 0.6 mm was generated.
Closing pressure: 60 ton
Mold temperature: 80° C.
Molding resin: Polycarbonate L1225L manufactured by TEIJIN CHEMICALS LTD.
Molding resin temperature: 295° C.
Injection rate: 50 mm/s
Molded product dimension (L×W×H): 60×60×3 mm
Gate: φ2 mm pin gate Example 10

After a black cross-linking ink layer was formed on one side (layer number 1 side) of the laminated film obtained in Example 1 by screening printing, a binder layer was formed. Printing conditions were as follows. The thickness of the cross-linking ink layer was 20 μm.
<Black Cross-Linking Ink Layer>
Coloring pigment: Carbon black MA100 manufactured by Mitsubishi Chemical Corporation, 8 parts by weight
Polyester polyol resin: VYLON 200 manufactured by TOYOBO CO., LTD., 25 parts by weight
Solvent: Cyclohexane 35 parts by weight
Cross-linking agent: Isocyanate-based crosslinking agent, Collonate 2096 manufactured by NIPPON POLYURETHANE INDUSTRY CO., LTD, 10 parts by weight
Screen mesh: T-225
Drying: 80° C.×10 min (box drying)
Coating time: Four times
<Binder>
Binder: IMB-003 manufactured by Teikoku Printing Inks Mfg. Co., Ltd.
Screen mesh: T-225
Drying: 90° C.×60 min (box drying)
Then, the film on which the cross-linking ink layer and the binder layer had been formed was cut into a predetermined dimension, set in a mold, and insert-molded under the following conditions. In the resulting molding, discoloration and ink flowing were not recognized, and the appearance was excellent. There was little warping.

Closing pressure: 60 ton
Mold temperature: 80° C.
Molding resin: Polycarbonate L1225L manufactured by TEIJIN CHEMICALS LTD.
Molding resin temperature: 295° C.
Injection rate: 50 mm/s
Molded product dimension (L×W×H): 60×60×3 mm
Gate: φ2 mm pin gate

TABLE 1

|  | Example 1 | Example 2 | Example 3 | Example 4 | Example 5 | Example 6 | Example 7 | Example 8 |
| --- | --- | --- | --- | --- | --- | --- | --- | --- |
| Resin A | PET | PEN | PC | PEN | PEN | PET | PET | PET |
| Resin B | PE/SPG•T/CHDC | PE/SPG•T/CHDC | PMMA | PE/SPG•T/CHDC | PMMA | PE/SPG•T/CHDC | PE/SPG•T/CHDC | PE/SPG•T/CHDC |
| Layer constitution | FIG. 1 | FIG. 1 | FIG. 1 | FIG. 2 | FIG. 2 | FIG. 3 | FIG. 4 | FIG. 5 |
| Total lamination number | 901 | 901 | 901 | 301 | 301 | 901 | 1001 | 901 |
| Layer thickness of La (nm) | 60 | 60 | 60 | 60 | 60 | 60 | 60 | 200 |
| Layer thickness of Lb (nm) | 200 | 200 | 200 | 201 | 201 | 250 | 250 | 60 |
| Layer thickness of Lc (nm) | 61 | 61 | 61 | 60 | 60 | 60 | 60 | 200 |
| Layer thickness of Ld (nm) | 202 | 202 | 202 | 200 | 200 | — | 251 | 59 |
| Layer number between La-Lc | 296 | 296 | 296 | 95 | 45 | 440 | 245 | 296 |
| Layer number between Lb-Ld | 140 | 142 | 143 | 45 | 95 | — | 245 | 139 |
| Layer thickness of Ma (nm) | 55 | 60 | 60 | 60 | 60 | 60 | 60 | 170 |
| Layer thickness of Mb (nm) | 201 | 200 | 200 | 200 | 200 | 250 | 251 | 50 |
| Layer thickness of Mc (nm) | 56 | 60 | 60 | 62 | 62 | 60 | 61 | 173 |
| Layer thickness of Md (nm) | 200 | 200 | 200 | 203 | 203 | — | 250 | 168 |
| Layer number between Ma-Mc | 295 | 295 | 295 | 95 | 95 | 439 | 245 | 295 |
| Layer number between Mb-Md | 139 | 142 | 142 | 45 | 45 | — | 245 | 140 |
| Peeling test | 0 | 0 | 5 | 0 | 25 | 0 | 0 | 0 |
| Range of chroma C in film width direction | 1 | 0.5 | 4 | 3 | 2 | 2 | 1 | 2 |
| Angle-dependant color difference ΔEab | 3 | 2 | 13 | 6 | 5 | 4 | 3 | 6 |
| Electromagnetic shielding property (dB) | Less than 1 | Less than 1 | Less than 1 | Less than 1 | Less than 1 | Less than 1 | Less than 1 | Less than 1 |
| Interference pattern | ○ | ○ | ○ | ○ | ○ | Δ | ○ | ○ |

TABLE 2

|  | Comparative example 1 | Comparative example 2 |
| --- | --- | --- |
| Resin A | PET | PET |
| Resin B | PE/SPG•T/CHDC | PE/SPG•T/CHDC |
| Layer constitution | FIG. 6 | FIG. 7 |
| Total lamination number | 901 | 199 |
| Layer thickness of La (nm) | — | 60 |
| Layer thickness of Lb (nm) | — | 200 |
| Layer thickness of Lc (nm) | — | 61 |
| Layer thickness of Ld (nm) | — | — |
| Layer number between La-Lc | — | 98 |
| Layer number between Lb-Ld | — | — |
| Layer thickness of Ma (nm) | — | 60 |
| Layer thickness of Mb (nm) | — | 201 |
| Layer thickness of Mc (nm) | — | 62 |
| Layer thickness of Md (nm) | — | — |
| Layer number between Ma-Mc | — | 98 |
| Layer number between Mb-Md | — | — |
| Peeling test | 0 | 0 |
| Range of chroma C in film width direction | 5 | 13 |
| Angle-dependant color difference ΔEab | 10 | 40 |
| Electromagnetic shielding property (dB) | Less than 1 | Less than 1 |
| Interference pattern | x | x |

The applications of the present invention are not particularly limited, and embodiments of the present invention can be particularly suitably used in mirrors, metal-tone decoration materials, optical members for display and the like.

The invention claimed is:

1. A laminated film with 200 or more laminated layers including at least layers comprising a resin A and layers comprising a resin B, wherein taking the layers comprising the resin A having a layer thickness from 10 nm to 1000 nm as a layer group L, wherein the layer group L has a three-step or more slant structure in which distribution of the layer thickness is approximated by three or more monotonous increase curves and/or monotonous decrease curves and, in the direction from one surface to the other, these are arranged in the order of a layer La, a layer Lb, and a layer Lc, wherein the thickness of the layer Lc is 0.95-fold or more and 1.05-fold or less relative to the thickness of the layer La and at least 30 layers, each layer comprising the resin A, are included between the layer La and the layer Lc, and the thickness of the layer La is at least 1.4-fold or more and 0.7-fold or less the thickness of the layer Lb.

2. The laminated film according to claim 1, wherein the layer group L has the layer La, the layer Lb, the layer Lc, and a layer Ld, in the direction from one surface to the other, these layers are arranged in the order of the layer La, the layer Lb, the layer Lc and the layer Ld, the thickness of the layer Lb and the thickness of the layer Ld are equal, and at least 30 layers, each layer comprising the resin A, are included between the layer Lb and the layer Ld.

3. The laminated film according to claim 1, wherein the thickness of the layer present between the layer La and the layer Lb is gradually increased, or gradually decreased from the layer La toward the layer Lb.

4. The laminated film according to claim 1, wherein the film has a layer Ma, a layer Mb and a layer Mc comprising the resin B, the layer La and the layer Ma are adjacent to each other, the layer Lb and the layer Mb are adjacent to each other, the layer Lc and the layer Mc are adjacent to each other, the thickness of the layer La is 1.4-fold or more the thickness of the layer Lb and the thickness of the layer Ma is 1.4-fold or more the thickness of the layer Mb, or the thickness of the layer La is 0.7-fold or less the thickness of the layer Lb and the thickness of the layer Ma is 0.7-fold or less the thickness of the layer Mb.

5. The laminated film according to claim 1, wherein a resin constituting a layer present between the layer La and the layer Lc is the resin A or the resin B.

6. The laminated film according to claim 1, wherein all layers included between a layer closest to one surface and a layer closest to the other surface in the layer group L contains a thermoplastic resin.

7. The laminated film according to claim 1, wherein a band width of a reflection band having a reflection ratio of 30% or more is 300 nm or more.

8. A laminated film comprising a cross-linking ink layer having a thickness of 18 μm or more and 80 μm or less on at least one side of the laminated film according to claim 1.

9. A molding comprising the laminated film according to claim 1.

10. A reflector comprising the laminated film according to claim 1.

* * * * *